(12) United States Patent
Eames et al.

(10) Patent No.: US 7,204,102 B1
(45) Date of Patent: Apr. 17, 2007

(54) METHOD OF SEALING GLASS

(75) Inventors: Philip Charles Eames, Co. Antrim (GB); Brian Norton, Co. Antrim (GB); Philip William Griffiths, Co. Antrim (GB); Trevor James Hyde, Belfast (GB)

(73) Assignee: University of Ulster, Newtownabbey, Co. Antrim (GB)

( * ) Notice: Subject to any disclaimer, the term of this patent is extended or adjusted under 35 U.S.C. 154(b) by 0 days.

(21) Appl. No.: 09/959,111

(22) PCT Filed: Apr. 17, 2000

(86) PCT No.: PCT/GB00/01495
§ 371 (c)(1),
(2), (4) Date: Feb. 11, 2002

(87) PCT Pub. No.: WO00/63130
PCT Pub. Date: Oct. 26, 2000

(30) Foreign Application Priority Data

Apr. 17, 1999 (GB) .................................. 9908703.3
Jul. 7, 1999 (GB) .................................. 9915795.0

(51) Int. Cl.
*C03B 23/203* (2006.01)
*B32B 3/18* (2006.01)

(52) U.S. Cl. .............................................. 65/36; 65/43
(58) Field of Classification Search .............. 65/41–43, 65/36, 60.1, 60.4; 438/118–119
See application file for complete search history.

(56) References Cited

U.S. PATENT DOCUMENTS 4,070,749 A * 1/1978 Misono et al. ............. 29/592.1
4,710,673 A * 12/1987 Vrijssen ................... 313/477 R
4,886,996 A * 12/1989 Field et al. ................. 313/400
5,279,851 A * 1/1994 Minosou et al. ......... 427/126.2

FOREIGN PATENT DOCUMENTS

EP 0287139 A 10/1988

OTHER PUBLICATIONS

Griffiths et al., "Fabrication of evacuated glazing at low temperature," *Solar Energy* 63:243-249 (1998).

* cited by examiner

*Primary Examiner*—Carlos Lopez
(74) *Attorney, Agent, or Firm*—Kirkpatrick & Lockhart Preston Gates Ellis LLP

(57) ABSTRACT

A method of forming an air-tight seal between two pieces of glass is described. It comprises the steps of: (a) introducing a layer of indium or indium alloy between opposing surfaces of the glass pieces; and (b) heating the indium or indium alloy layers and the glass pieces, preferably under vacuum, to a temperature, generally around or below 220° C., to melt the layers to form the seal between the pieces. The method is suitable to form a relatively small air-type seal between two glass panes or sheets, and is particularly suitable for the formation of evacuated double glazing units. Optionally, an additional metal layer is located between the indium or indium alloy layers.

38 Claims, 4 Drawing Sheets

METHOD OF SEALING GLASS

This invention relates to a method of forming an air-tight seal between two pieces of glass, particularly but not exclusively two panes of glass to form an evacuated double glazing unit.

Low heat loss and high total solar transmittance can be obtained from a contiguously-sealed double glazing unit with an evacuated gap. Evacuated glazing generally consists of two glass sheets separated by a regular array of support pillars, typically 0.2 mm high. A contiguous seal provides an air-tight unit which is in general evacuated to 0.1 Pa or less to reduce gaseous conduction to a minimal level.

Presently, vacuum glazing units have only been manufactured using a solder glass seal formed at temperatures above 400° C. between the glass pieces. The air is subsequently pumped out from between the pieces using a pump-out tube. However, because of the need for such high temperatures to produce the solder glass edge seal, present evacuated glazing units are limited to using hard-coated types of low-emittance films or coatings on their internal glass surfaces, and cannot be made with tempered glass. Many high performance low emittance coatings cannot at present survive temperatures in excess of 200° C. or so for any prolonged period of time.

Low emittance coatings reduce long wave radiative heat transfer through the glazing unit. However, hard coatings have in general higher emittance to long-wave radiation in the range 2.5–30 μm than soft-coated films, which have emittances <0.1.

It is an object of the present invention to provide a method of forming an air-tight seal between two pieces, particularly panes, of glass at temperatures around or below 220° C., so as to allow the use of high performance, ie soft-coated, low-emittance coatings and tempered glass.

According to one aspect of the present invention, there is provided a method of forming an air-tight seal between two pieces of glass comprising the steps of:
 (a) introducing one or more layers of indium or indium alloy between opposing surfaces of the glass pieces; and
 (b) heating the indium or indium alloy layer(s) and the glass pieces to a temperature to melt the layer(s) and so form the seal between the pieces.

Indium, or indium alloy, has been found to be particularly useful in forming an air-tight seal between two pieces of glass, once the indium or indium alloy has been suitably positioned onto the glass, made molten, and then cooled.

A layer of indium or indium alloy is preferably added onto each piece of glass (prior to heating) in the region of the seal, and this can be carried out using any of the known and suitable metal-glass deposition or bonding techniques.

According to one embodiment of the present invention, indium or an indium alloy can be deposited onto glass using a vacuum deposition technique.

According to another embodiment of the present invention, the indium or indium alloy can be deposited onto glass using an ultrasonic soldering technique.

Preferably, any coating or film on the glass is removed from at least the intended area of the seal prior to the application of indium or indium alloy to such glass. Moreover, the glass is preferably cleaned and/or baked prior to the application of the indium or indium alloy.

Preferably, the glass pieces with the layer(s) of indium or indium alloy are heated to a uniform temperature to provide constant and equivalent bonding at each and every location, and more preferably a relatively slow heating regime is used.

The heating temperature is dependent on which indium or indium alloy is used. Most if not all suitable materials melt at 220° C. or less, generally 200° C. or less. Therefore, the temperature of the heating should generally not exceed 220° C., and will commonly be below 200° C.

The use of pressure, eg clamps or a weight on the top glass pieces, should reduce the degree of heating required to effect the indium seal between the pieces.

According to a further embodiment of the present invention, one or more, preferably one, additional metal layers can be located between the indium or indium alloy surface films. Such metal layer could be in the form of a wire or a gasket, etc. The metal layer could be made from any suitable metal or alloy able to bond with indium or indium alloy. Such metals include indium or an indium alloy, or other metals eg copper or steel such as stainless steel. Such other metal layers could be added per se, or pre-coated with indium or a suitable indium alloy to assist bonding when heated.

The use of an intermediate metal layer assists if the deposited layers of indium or indium alloy on the glass pieces are not of the correct thickness or uniformity to allow them to meet and so bond together when they and the glass pieces are heated, and/or to generally increase the separation between the glass pieces, and/or to reduce the thickness of the indium or indium alloy surface film required, and/or to provide good inter-metal bonding.

Thus, according to a particular embodiment of the present invention, there is provided a method of forming an air-tight seal between two pieces of glass comprising the steps of;
 (a) adding a layer of indium or indium alloy onto opposing surfaces of the glass pieces in the region of the seal;
 (b) locating an additional metal layer onto one of the indium or indium alloy layers; and
 (c) bringing the glass pieces together to provide contact between the indium or indium alloy layers and the intermediate metal layer, and heating them and the glass pieces to a temperature between 220°–100° celsius to form a seal between the pieces.

The heating temperature and regime depends upon the indium or which indium alloy is used.

In an alternative arrangement, the layers of indium or indium alloy are provided as the coating around a suitable support such as a metal wire or gasket, which coated support is placed directly between the glass pieces and heated, preferably with associated pressure, to form the seal.

The thickness of the seal of the present invention may be similar to the thickness of existing seals, e.g. between 0.05–0.2 mm or more. Intermediate support pillars between glass panes are commonly about 0.1–0.2 mm in height. The width of the seal may again be similar to that of existing seals, e.g. between 3–10 mm.

The pieces of glass could be of any suitable size, shape or design, between which a seal is desired. The two pieces need not be similar in size, shape or design. The present invention is suitable to form a relatively small air-type seal between two glass panes or sheets. The invention is particularly suitable for the formation of evacuated double glazing units. Thus preferably, the heating to form the seal is conducted under vacuum.

Larger glazing units can also be formed by the present invention using additional sheets of glass to provide eg triple glazing units with either one or two of the inner spaces between the three sheets evacuated. Triple glazing can be used to minimise wind loading on vacuum glazing, and allow larger panes to be utilised.

The normal spacing for double glazing could still be used between the evacuated component and a third glass sheet.

An advantage of the use of a third glass pane is a reduction in thermal gradients, and thus reduction in expansion/contraction of the vacuum glazing unit, and subsequent induced thermal stress.

One or more of the glass pieces being sealed by the present invention, in particular one or more of the glass panes of a double or multiple gazing unit, could also be coated to minimise solar gain and thus make the vacuum glazing unit suitable for use in hot climates (with a consequent large reduction in any air conditioning load). This allows the introduction of additional glazing technologies such as electrochromics, photochromics and thermochromics, which enable the glazing to be changed from transparent to opaque. Such technologies cannot be used with existing sealing techniques, the temperatures for which are so high as to destroy the chromicity.

The invention is also suitable for sealing holes or apertures in a piece of glass, e.g. a pump-out hole. The indium or indium alloy could be added around the hole or aperture, and similarly layered on a glass cover piece, not necessarily being flat.

According to a second aspect of the present invention, there is provided a glass unit comprising at least two pieces of glass having at least one air-tight seal thereinbetween, wherein the seal is formed using molten indium or suitable indium alloy.

The seal is preferably formed according to the method herein described.

The unit is preferably a double or multiple glazing unit, more preferably an evacuated double or multiple glazing unit.

Embodiments of the present invention will now be described by way of example only with reference to the accompanying drawings in which.

Figure 1:
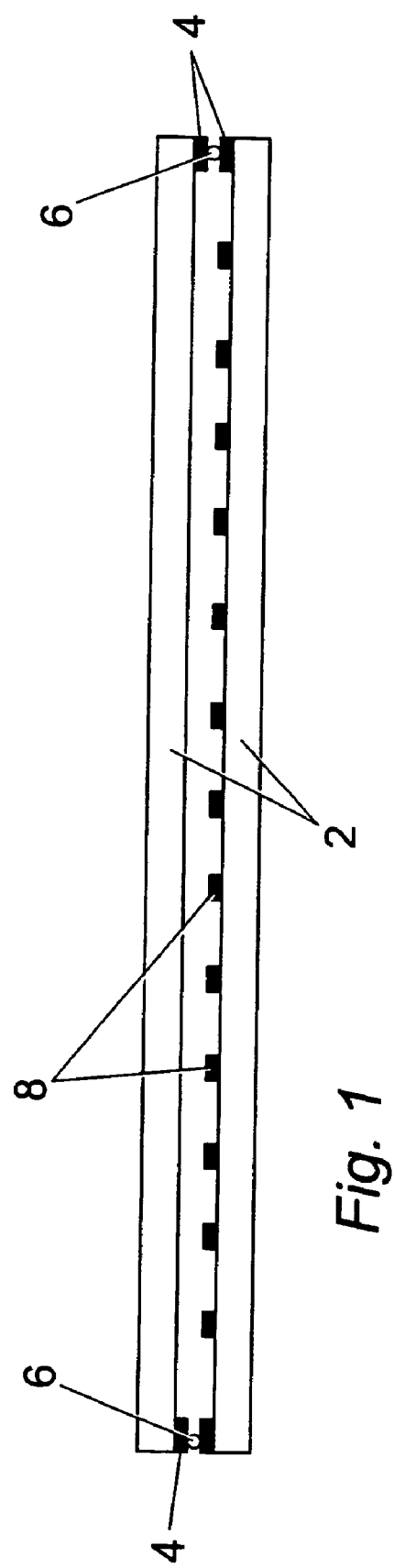
FIG. 1 shows a schematic cross sectional side view of two bonded glass panes prior to seal being formed.

FIG. 1 shows two panes of glass 2 suitable for forming a double glazing unit. Along the edges of each pane 2, there is a layer of indium 4. Between the indium layers 4, there is shown pieces of indium wire 6 which may be required should the indium layers 4 not meet when the panes 2 are brought together. FIG. 1 also shows an array of pillars 8 to provide support between the panes 2.

The forming of the seal maybe be performed in the following manner. The glass panes, either with or without low emittance coatings, can be cleaned using suitable solvents and/or detergents. The cleaned panes can then be baked out for a period of time at a temperature less than that resulting in degradation of any coatings. If the coatings are incompatible with the indium or indium alloy, they should be removed in the location of the intended seal.

The indium films are then deposited onto the surfaces of both glass panes in the region of the intended seal, either using a vacuum deposition technique, or an ultrasonic soldering iron or other known methods suitable to bond indium to glass.

The pillar array is then arranged between the panes.

If, once the pillar array is positioned, the deposited layers of indium are not of the correct thickness or uniformity to allow them to mate when the top glass pane is located on the pillar array, indium or indium alloy wire or a gasket is located between the indium films. Vacuum deposition can deposit layers of indium or indium alloy up to 1 µm thick. Ultrasonic soldering can deposit thicker layers.

The provision of the vacuum between the panes of a double glazing unit can also be provided in any known manner.

Using the vacuum chamber evacuation method, a vacuum chamber is evacuated to a pressure of less than 0.1 Pa, with the panes and the indium or indium alloy therein. The heat is then supplied, possibly using radiant heaters or a heat platen, to raise the temperature of the glass and the indium or indium alloy to a temperature at which the indium or indium alloy films, and any wire, etc, fuse. For indium this temperature is approximately 157° C. Some indium alloys have lower temperature requirements, others slightly higher. The temperature can be reduced by applying pressure, generally on the top glass pane. Preferably the temperature is uniform and is less than that at which the indium could flow and so to avoid causing gaps in the seal and local pooling effects.

Figure 2:
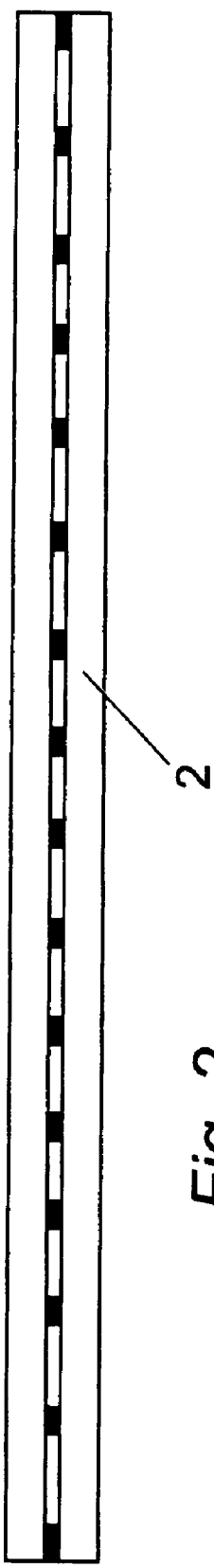
FIG. 2 shows a schematic cross sectional side view after seal is formed.

Once the system is cooled and the chamber is returned to atmospheric pressure, an evacuated vacuum double glazing unit is inherently provided. FIG. 2 shows a formed unit.

Alternatively, the vacuum in the double glazing unit can be formed using the pump-out tube method. In this method, a pump-out tube is located in the upper glass pane prior to any cleaning and the deposition of any indium or indium alloy.

The lower glass pane is generally located in an oven or on a heated platen, with the upper sheet positioned so that the two deposited indium or indium alloy surfaces are touching. Heat is applied to raise the temperature of the glass and the indium or indium alloy to a temperature at which the indium or indium alloy films and any wire etc, fuse. Again the temperature can be reduced by applying pressure, and it is preferred that the temperature is uniform and is less than that at which the indium could flow to cause gaps in the seal and local pooling effects.

A vacuum reservoir is attached to the pump-out tube and used to evacuate the glazing unit to a pressure of less than 0.1 Pa. An electrical resistance heater is used to seal the pump-out tube.

Figure 3A:
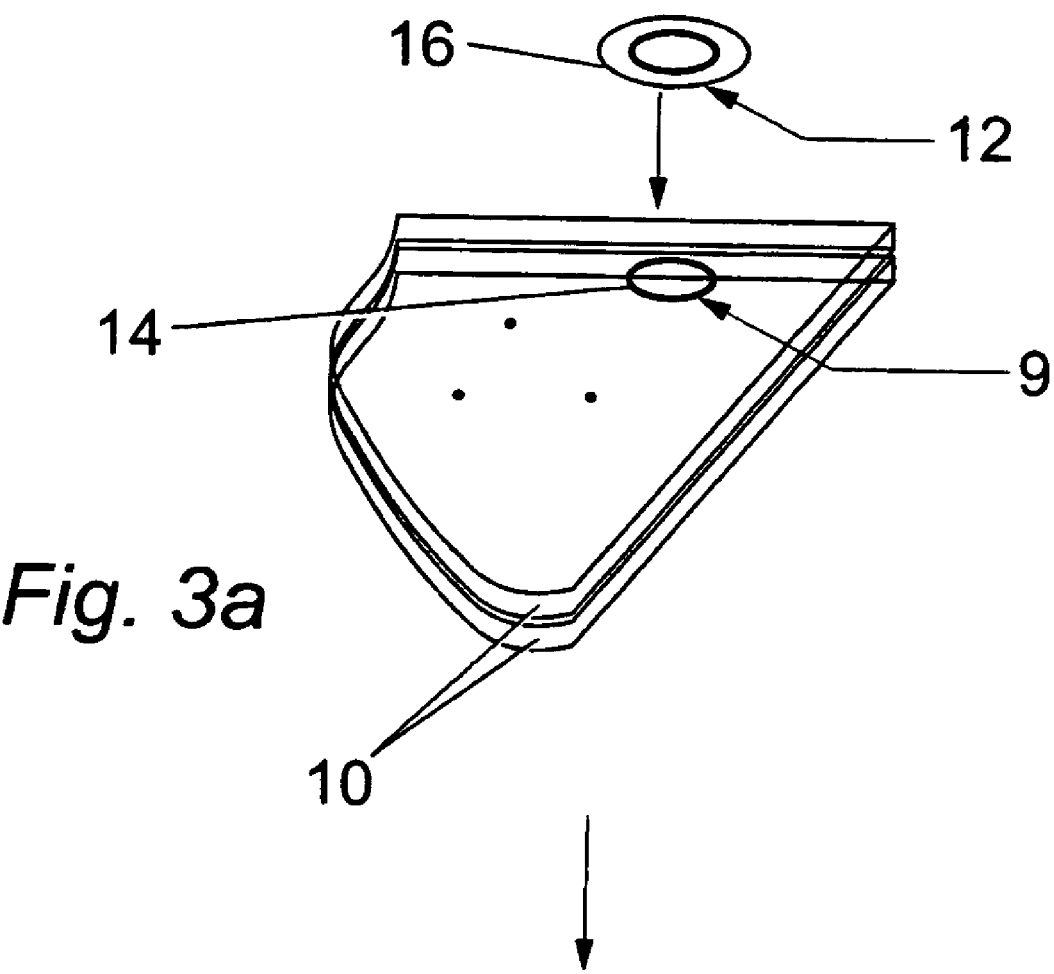
FIGS. 3a and 3b are schematic perspective views of two glass pieces being bonded according to another embodiment of the present invention.
Figure 3B:
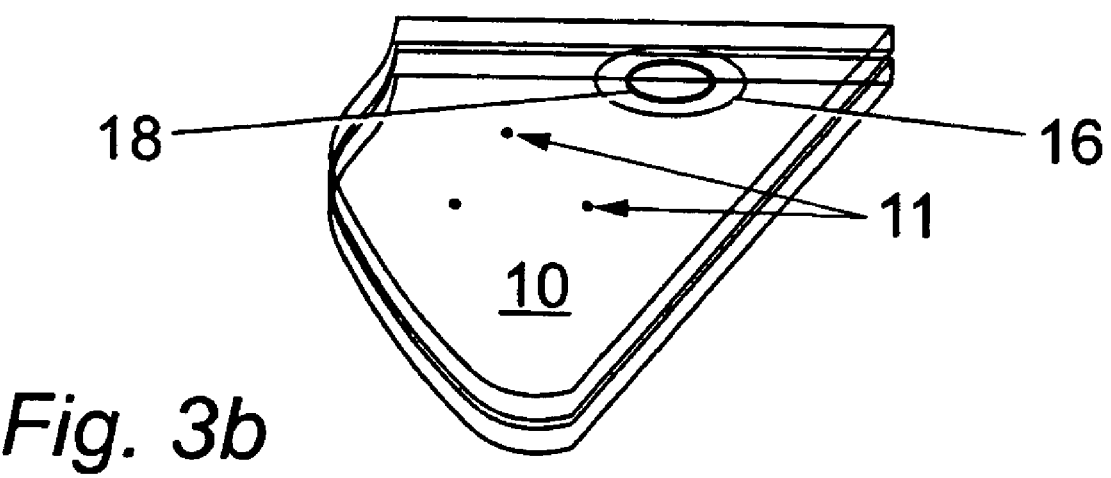

Alternatively, the pump-out hole is sealed as shown in FIGS. 3a and 3b. A thin ring of indium or indium alloy 9 is deposited around the small diameter hole 14 pre-drilled into one of the two glass sheets 10, (between which sheets 10 is also a pillar array 11). A thin ring of indium or indium alloy 12 is also coated onto a glass cover slide 16 of radius approximately 7.5 mm with a bevelled upper edge.

The glass cover slide 16 is located over the pump-out hole 14 so that the two rings of indium or indium alloy 9,12 substantially mate. A vacuum cup fitting (not shown) is located on to the glass surface 10 so that the cover slide 16 is completely enclosed within it. A small heater element within the vacuum fitting locates over the cover slide 16 and holds it in location while vacuum pump-out occurs through the natural gaps between indium or indium alloy layers 9, 12.

When a sufficient level of vacuum is attained the power to the heater element is turned on, and sufficient heat supplied to raise the temperature of the metal so that a seal 18 is formed (FIG. 3b). A pressure may be exerted onto the cover slide 16 to reduce the temperature required for seal formation. The seal procedure may be undertaken in an oven heated to a temperature sufficient to enable outgassing from the glass sheets but not high enough to result in seal failure. This results in a much lower temperature rise being required to seal the pump-out hole.

The main sealants used are indiums, or an indium alloy formed with one or more of the group comprising tin, silver and lead, such as indium/tin alloys, indium/tin/silver alloys, or other indium based alloys with the desired melting temperatures, bonding and strength characteristics.

Figure 4:
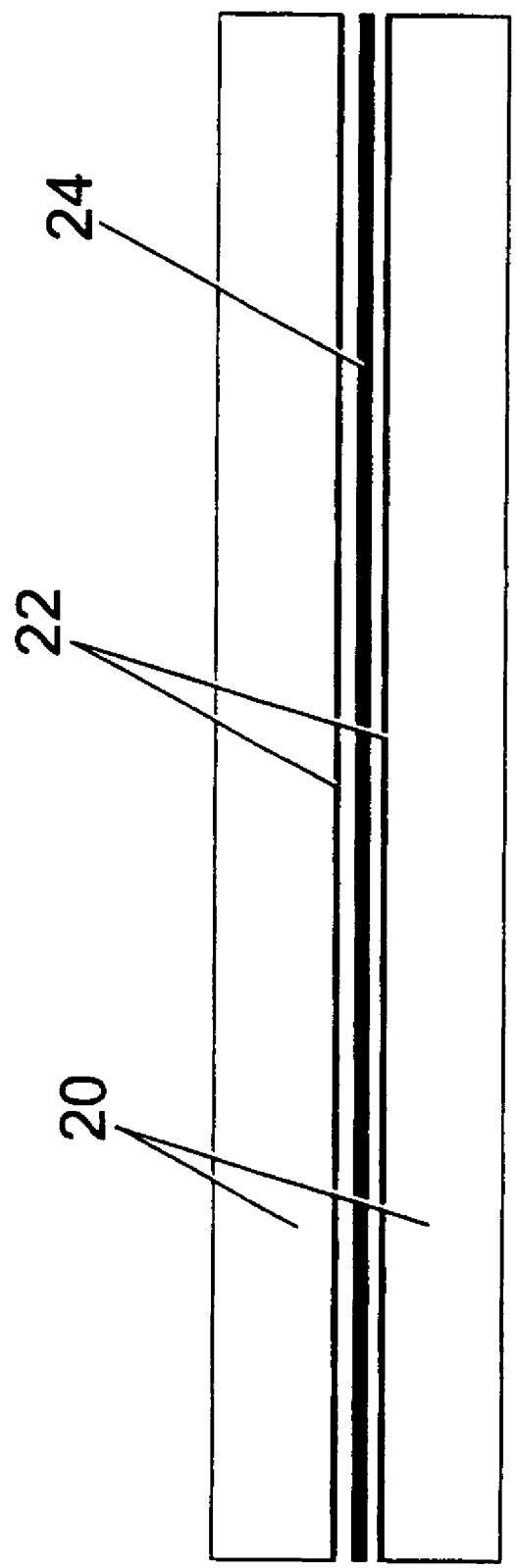
FIG. 4 is a part side view of two glass panes to be bonded using a metal gasket thereinbetween.

A vacuum edge seal may also be formed as shown in FIG. 4. FIG. 4 shows two panes of glass 20, and on both panes of glass 20 in the region adjacent to the edge are thin layers of indium or indium alloy 22. These layers of indium or indium alloy can be laid down using an ultrasonic soldering iron or preferably via vacuum deposition. Between the indium layers 22 is a thin metal gasket 24 made for example from copper. Copper and indium bond well together, and the use of a copper gasket allows the use of micro layers of indium on the glass, which should reduce cost. The copper gasket 24 is deposited on the indium layer 22 of the lower glass pane 20, and the indium layer 22 on the face of the upper glass pane 20 is then located on the metal gasket 24. Heating the unit as mentioned above forms seals between the indium layers 22 and the metal gasket 24. The sealing mechanism could be performed in vacuum, or in an oven with subsequent pump-out via a pump-out tube, as described above.

The present invention provides a method of fabricating seals between glass pieces, in particular evacuated double or multiple glazing units at relatively low temperatures. These allow the use of soft coatings such as those consisting of multiple dielectric/metal/dielectric layers on glass, to give optimal thermal and optical performance. With reduced rates of heat transfer through the glazing unit, there is lower heat loss in buildings with high visible transmittance. Such glazing units could also be used eg for transparent doors for refrigerators, or solar energy collector covers, or in conjunction with electrochromics, photochromics or thermochromics.

The use of low sealing temperatures facilitates the use of tempered glass, thus significantly extending the range of application of evacuated glazing. Due to the increased pillar spacing possible with tempered glass, it also allows reduced heat transfer rates to be achieved.

The use of low fabrication temperatures also reduces embodied energy, and reduces any possible film or coating degradation during the fabrication process, and reduces stress in the region of the edge seal system.

The invention claimed is:

1. A method of forming an air-tight seal between two pieces of glass, comprising the steps of:
   (a) introducing one or more layers of indium or indium alloy onto one or more opposing surfaces of the glass pieces in the region of the seal using an ultrasonic soldering technique;
   (b) locating an additional metal layer onto one of the one or more indium or indium alloy layers to provide an intermediate metal layer; and
   (c) bringing the glass pieces together to provide contact between the one or more indium or indium alloy layers and the intermediate metal layer, and heating the indium or indium alloy layers, the intermediate metal layer and the glass pieces to a temperature between 220° and 100° C. to form a seal between the pieces.

2. A method as claimed in claim 1 wherein any coating or film on the glass is removed from an intended area of the seal prior to the application of indium or indium alloy to such area.

3. A method as claimed in claim 1 wherein the glass is cleaned and/or baked prior to the application of the indium or indium alloy.

4. A method as claimed in claim 1 wherein additional pressure is applied to one or both glass pieces during the heating.

5. A method as claimed in claim 1 wherein the metal layer is in the form of a wire or a gasket.

6. A method as claimed in claim 1 wherein the metal of the additional metal layer is able to bond with indium or indium alloy.

7. A method as claimed in claim 1 wherein the metal is indium, indium alloy, copper, stainless steel, indium or indium alloy-coated copper, indium or indium alloy-coated stainless steel or any combination thereof.

8. A method as claimed in claim 1 wherein the indium alloy is formed from indium and one or more of the group consisting of: tin, silver and lead.

9. A method as claimed in claim 1, wherein the sealing is conducted under vacuum.

10. A method as claimed in claim 1, wherein the method forms a vacuum-tight seal between two glass panes or sheets.

11. A method as claimed in claim 10, wherein the method forms a double or multiple glazing unit.

12. A method as claimed in claim 11 wherein the doable or multiple glazing unit is an evacuated unit.

13. A method as claimed in claim 12 wherein the unit is edge sealed prior to evacuation.

14. A method as claimed in claim 13 wherein the unit is evacuated through a pump-out hole.

15. A method as claimed in claim 14 wherein the pump-out hole is sealed by:
   (a) introducing a hole-sealing layer of indium or indium alloy onto one or both opposing surfaces of a glass cover piece and the glass surface around the pump-out hole; and
   (b) beating the hole-sealing layer of indium or indium alloy and the glass pieces to a temperature to melt the hole-sealing layer of indium or indium alloy between the glass cover piece and the glass surface around the pump-out hole to form the air-tight seal between the pieces.

16. A method as claimed in claim 15 wherein the temperature used for sealing the pump-out hole is less than the temperature used for sealing the glass panes.

17. A method as claimed in claim 1, wherein one or more of the pieces of glass are tempered glass.

18. A method as claimed in claim 1, wherein one or more of the glass pieces has an electrochromic, photochromic or thermochromic film thereon.

19. A method of forming an air-tight seal between two pieces of glass comprising the steps of:
   (a) introducing one or more layers of indium or indium alloy onto one or both opposing surfaces of the glass pieces, where the one or more layers of indium or indium alloy are provided as a coating around a suitable support; and
   (b) heating the one or more indium or indium alloy layers and the glass pieces to a temperature to melt the layers between the two glass pieces to form the seal between the pieces.

20. A method as claimed in claim 19 wherein the support is an additional metal layer.

21. A method as claimed in claim 19, wherein any coating or film on the glass is removed from an intended area of the seal prior to the application of indium or indium alloy to such area.

22. A method as claimed in claim 19 wherein the glass is cleaned and/or baked prior to the application of the indium or indium alloy.

23. A method as claimed in claim 20, wherein the metal layer is in the form of a wire or a gasket.

24. A method as claimed in claim 20 wherein the metal of the additional metal layer is able to bond with indium or indium alloy.

25. A method as claimed in claim 20 wherein the metal is indium, indium alloy, copper, stainless steel, indium or indium alloy-coated copper, indium or indium alloy-coated stainless steel or any combination thereof.

26. A method as claimed in claim 19 wherein the indium alloy is formed from indium and one or more of the group consisting of: tin, silver and lead.

27. A method as claimed in claim 19 wherein the temperature of the heating does not exceed 220° C.

28. A method as claimed in claim 19 wherein additional pressure is applied to one or both glass pieces during the heating.

29. A method as claimed in claim 19, wherein the sealing is conducted under vacuum.

30. A method as claimed in claim 19, wherein the method forms a vacuum-tight seal between two glass panes or sheets.

31. A method as claimed in claim 30, wherein the method forms a double or multiple glazing unit.

32. A method as claimed in claim 31 wherein the double or multiple glazing unit is an evacuated unit.

33. A method as claimed in claim 32 wherein the unit is edge sealed prior to evacuation.

34. A method as claimed in claim 33 wherein the unit is evacuated through a pump-out hole.

35. A method as claimed in claim 34 wherein the pump-out hole is sealed by:

(a) introducing a hole-sealing layer of indium or indium alloy onto one or both opposing surfaces of a glass cover piece and the glass surface around the pump-out hole; and (b) heating the hole-sealing layer of indium or indium alloy and the glass pieces to a temperature to melt the hole-sealing layer of indium or indium alloy between the glass cover piece and the glass surface around the pump-out hole to form the air-tight seal between the pieces.

36. A method as claimed in claim 35 wherein the temperature used for sealing the pump-out hole is less than the temperature used for sealing the glass panes.

37. A method as claimed in claim 19, wherein one or more of the pieces of glass are tempered glass.

38. A method as claimed in claim 19, wherein one or more of the glass pieces has an electrochromic, photochromic or the thermochromic film thereon.

* * * * *

UNITED STATES PATENT AND TRADEMARK OFFICE
CERTIFICATE OF CORRECTION

PATENT NO.         : 7,204,102 B1
APPLICATION NO.    : 09/959111
DATED              : April 17, 2007
INVENTOR(S)        : Eames et al.

It is certified that error appears in the above-identified patent and that said Letters Patent is hereby corrected as shown below:

Claim 1 at column 5, line 55 "locating" should be changed to --introducing--.

Claim 12 at column 6, line 27 "doable" should be changed to --double--.

Signed and Sealed this

Twenty-ninth Day of September, 2009

David J. Kappos
*Director of the United States Patent and Trademark Office*